United States Patent
Khemakhem et al.

(10) Patent No.: US 8,147,147 B2
(45) Date of Patent: *Apr. 3, 2012

(54) HYBRID FIBER/COPPER CONNECTOR SYSTEM AND METHOD

(75) Inventors: M'hamed Anis Khemakhem, Minnetonka, MN (US); Dean Michael Rosenthal, West St. Paul, MN (US); Duane Sand, Brooklyn Park, MN (US); Jeffery Louis Peters, Eagan, MN (US); Joy K. McKnight, Carver, MN (US); Ross Heggestad, Apple Valley, MN (US); Patrick Jude Nault, Carver, MN (US); Foad Abdulkadir Mohamed Ahmed, Minneapolis, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 104 days.

This patent is subject to a terminal disclaimer.

(21) Appl. No.: 12/421,106

(22) Filed: Apr. 9, 2009

(65) Prior Publication Data
US 2010/0040331 A1 Feb. 18, 2010

Related U.S. Application Data

(63) Continuation of application No. 11/732,124, filed on Apr. 2, 2007, now Pat. No. 7,520,678, which is a continuation of application No. 10/938,136, filed on Sep. 10, 2004, now Pat. No. 7,213,975.

(51) Int. Cl.
*G02B 6/38* (2006.01)
*G02B 6/36* (2006.01)
*G02B 6/40* (2006.01)
*G02B 6/44* (2006.01)
*G02B 6/00* (2006.01)

(52) U.S. Cl. ............... 385/75; 385/53; 385/55; 385/56; 385/76; 385/101; 385/103; 385/113; 385/139

(58) Field of Classification Search ............... 385/53, 385/55, 56, 58–60, 75–78, 88–89, 100–103, 385/106, 109, 112–114, 135, 139
See application file for complete search history.

(56) References Cited

U.S. PATENT DOCUMENTS

| 4,449,784 | A | 5/1984 | Basov et al. |
| 4,728,171 | A | 3/1988 | Schofield et al. |
| 5,109,452 | A | 4/1992 | Selvin et al. |
| 5,242,315 | A | 9/1993 | O'Dea |

(Continued)

FOREIGN PATENT DOCUMENTS
DE 202 02 835 U1 3/2003
(Continued)

OTHER PUBLICATIONS

Telecast Fiber Systems, Inc., SHED™, SMPTE Hybrid Elimination Devices, 2003, pp. 1-2.

(Continued)

*Primary Examiner* — Uyen Chau N Le
*Assistant Examiner* — Michael Mooney
(74) *Attorney, Agent, or Firm* — Merchant & Gould P.C.

(57) ABSTRACT

A junction box and hybrid fiber optic cable connector which permit repair of damaged fibers or copper conductors carried by a hybrid fiber/copper cable without requiring replacement of the entire cable assembly or retermination of the cable. A method of repairing a hybrid fiber/copper cable and connector.

2 Claims, 16 Drawing Sheets

U.S. PATENT DOCUMENTS

| | | | |
|---|---|---|---|
| 5,745,622 A | 4/1998 | Birnbaum et al. | |
| 5,982,971 A * | 11/1999 | Amirkalali | 385/135 |
| 6,115,159 A | 9/2000 | Baker | |
| 6,142,676 A * | 11/2000 | Lu | 385/60 |
| 6,234,683 B1 | 5/2001 | Waldron et al. | |
| 6,254,278 B1 | 7/2001 | Andrews et al. | |
| 6,357,931 B1 | 3/2002 | Shirakawa et al. | |
| 6,475,009 B2 | 11/2002 | Below et al. | |
| 6,478,625 B2 | 11/2002 | Tolmie et al. | |
| 6,579,014 B2 | 6/2003 | Melton et al. | |
| 6,612,857 B2 | 9/2003 | Tolmie | |
| 6,648,520 B2 | 11/2003 | McDonald et al. | |
| 6,719,461 B2 | 4/2004 | Cull | |
| 6,739,759 B1 | 5/2004 | Seeley | |
| 6,962,445 B2 | 11/2005 | Zimmel et al. | |
| 7,213,975 B2 * | 5/2007 | Khemakhem et al. | 385/75 |

FOREIGN PATENT DOCUMENTS

| | | |
|---|---|---|
| EP | 0 204 581 A2 | 12/1986 |
| GB | 2 154 333 A | 9/1985 |

OTHER PUBLICATIONS

Telecast Fiber Systems, Inc., Cobra™, Triax-to-Fiber Camera Interface—Now for High Definition and High Speed Cameras, 2003, pp. 1-2.

LEMO® USA, Inc., LEMO's Audio Video Connectors—Coax, Triax, Fiber Optic and Hybrid Applications, 2003, pp. 1-51.

Lemo 3K.93C Series Connector Brochure, undated, 22 pages.

* cited by examiner

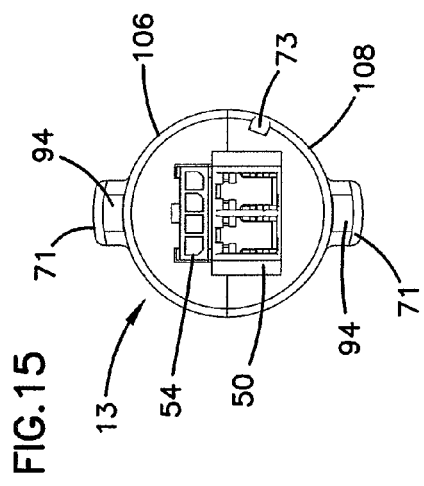
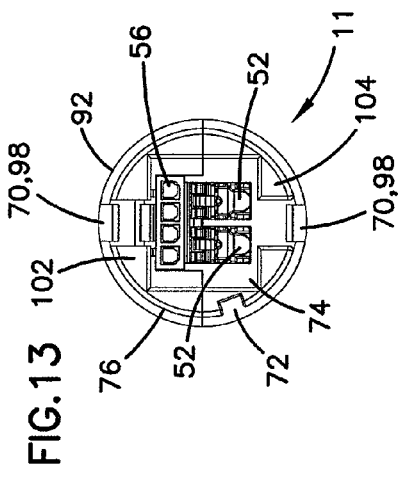
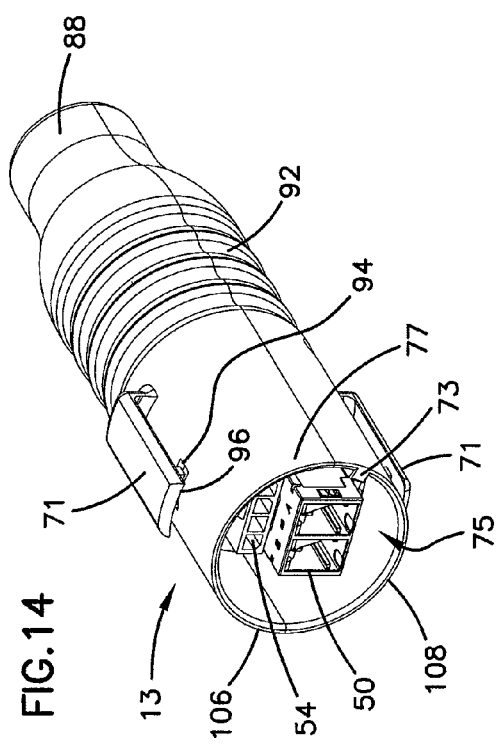
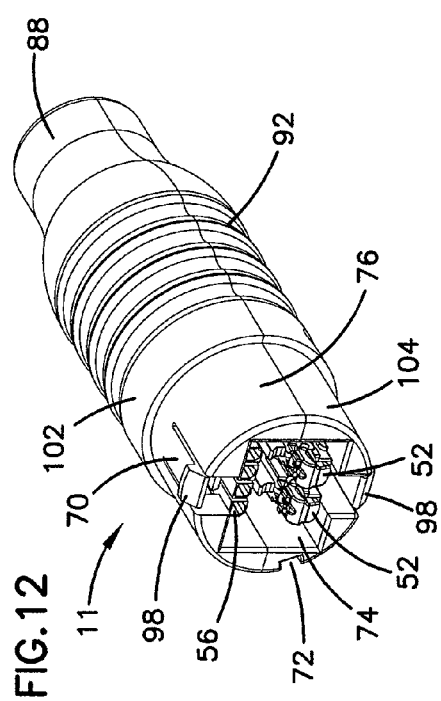

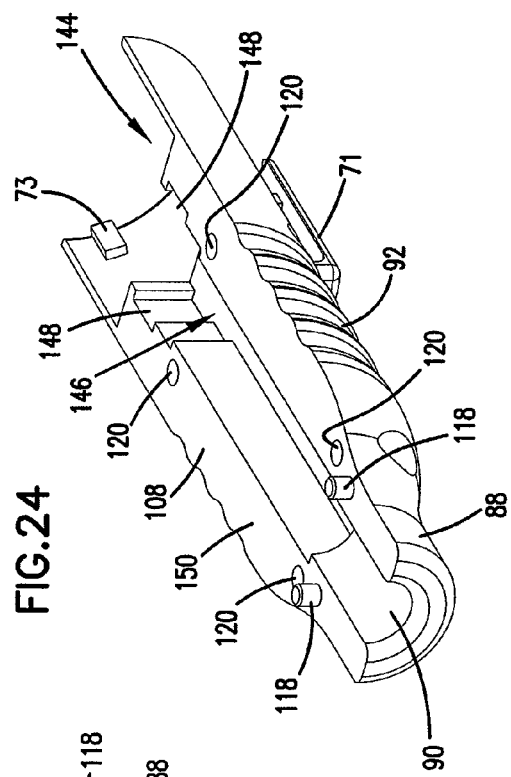
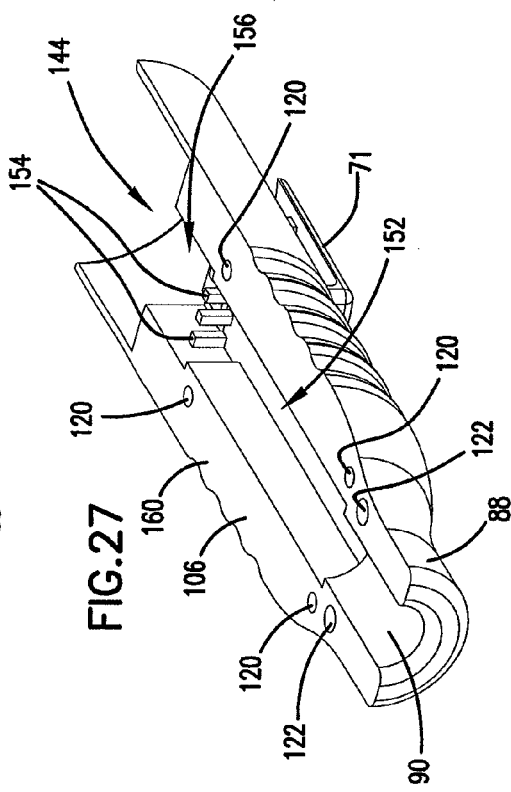
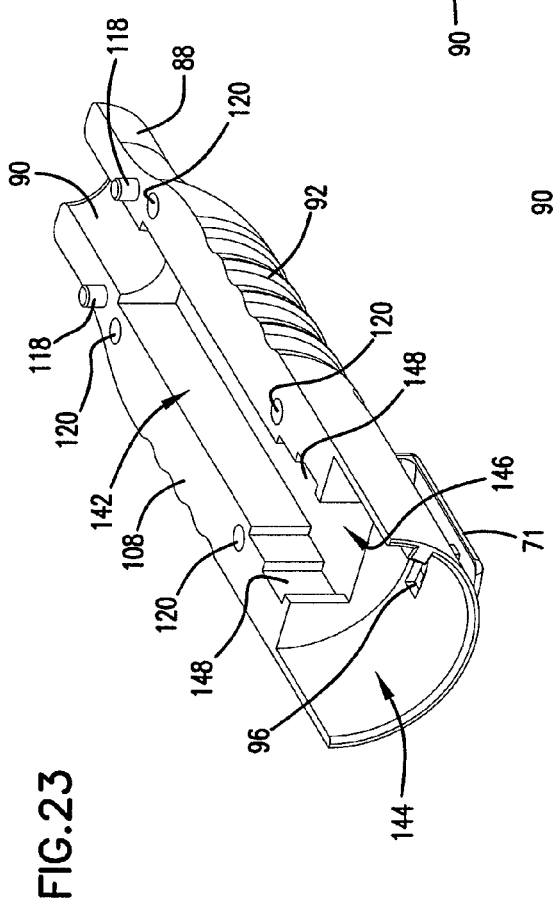
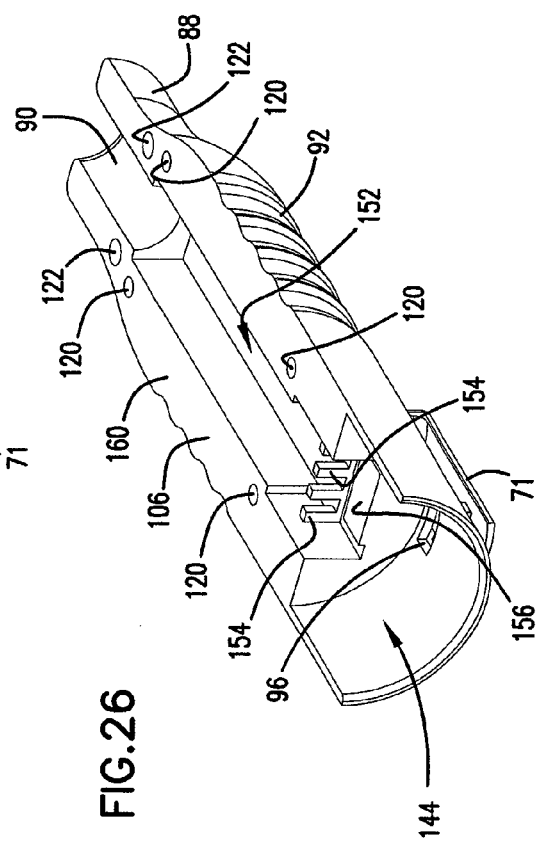

HYBRID FIBER/COPPER CONNECTOR SYSTEM AND METHOD

CROSS REFERENCE TO RELATED APPLICATIONS

This application is a continuation of application Ser. No. 11/732,124, filed Apr. 2, 2007, which is a continuation of application Ser. No. 10/938,136, filed Sep. 10, 2004, now U.S. Pat. No. 7,213,975, which applications are incorporated herein by reference.

FIELD

The present invention relates generally to connectors for communications cable. More specifically, the present invention relates to hybrid fiber/copper connector systems and methods.

BACKGROUND

It is known to provide portable cameras and other data or imaging gathering devices with cable to provide power to the device and to carry data to and from the device. As these devices have increased in image or data gathering capacity, greater demand for bandwidth to carry data to and from the devices has arisen. One way of providing this increased bandwidth is to use optical fiber for carrying data to and from the devices.

However, optical fiber may not be able to provide an adequate power supply for the devices, so it is still desirable to have copper or other metallic wires extending to the devices. Hybrid cables including both copper and optical fiber within a single cable have been used to meet the power and data transfer needs of these devices. Since the techniques and devices for terminating and connectorizing copper and fiber cables are quite different, new connectors or methods of connecting such hybrid cables to each have been developed. These known connectors do allow interconnection of cables and devices but require that the entire connector be replaced if any one element of the cable or connector are damaged. Common hybrid cables may include two or more optical fibers and one or more pairs of copper wires. If any of these wires or the termination of these wires are damaged, the entire connector must be replaced and all of the wires and fibers re-terminated.

Improvements to hybrid connectors are desirable.

SUMMARY

The present invention relates generally to a hybrid fiber/copper connector. More specifically, the present invention relates to a junction box and hybrid fiber optic cable connector which permit repair of damaged fibers or copper conductors carried by a hybrid fiber/copper cable without requiring replacement of the entire cable assembly or retermination of the cable. The present invention also relates to connectors for hybrid fiber/copper cables. The present invention also relates to a junction box for use with hybrid cables. The present invention further relates to a method of repairing a hybrid fiber/copper cable and connector.

BRIEF DESCRIPTION OF THE DRAWINGS

The accompanying drawings, which are incorporated in and constitute a part of the specification, illustrate several aspects of the present invention and together with the description, serve to explain the principles of the invention. A brief description of the drawings is as follows:

FIG. 12 is a perspective view of the mating cable connector of FIG. 11.

FIG. 13 is an end view of the mating cable connector of FIG. 11.

FIG. 14 is a perspective view of the second mating cable connector of FIG. 5.

FIG. 15 is an end view of the cable connector of FIG. 14.

FIG. 23 is a first perspective view of the first housing half of FIG. 22.

FIG. 24 is a second perspective view of the first housing half of FIG. 22.

FIG. 26 is a first perspective view of the second housing half of FIG. 25.

FIG. 27 is a second perspective view of the second housing half of FIG. 25.

DETAILED DESCRIPTION

Reference will now be made in detail to the exemplary aspects of the present invention that are illustrated in the accompanying drawings. Wherever possible, the same reference numbers will be used throughout the drawings to refer to the same or like parts.

Figure 1:
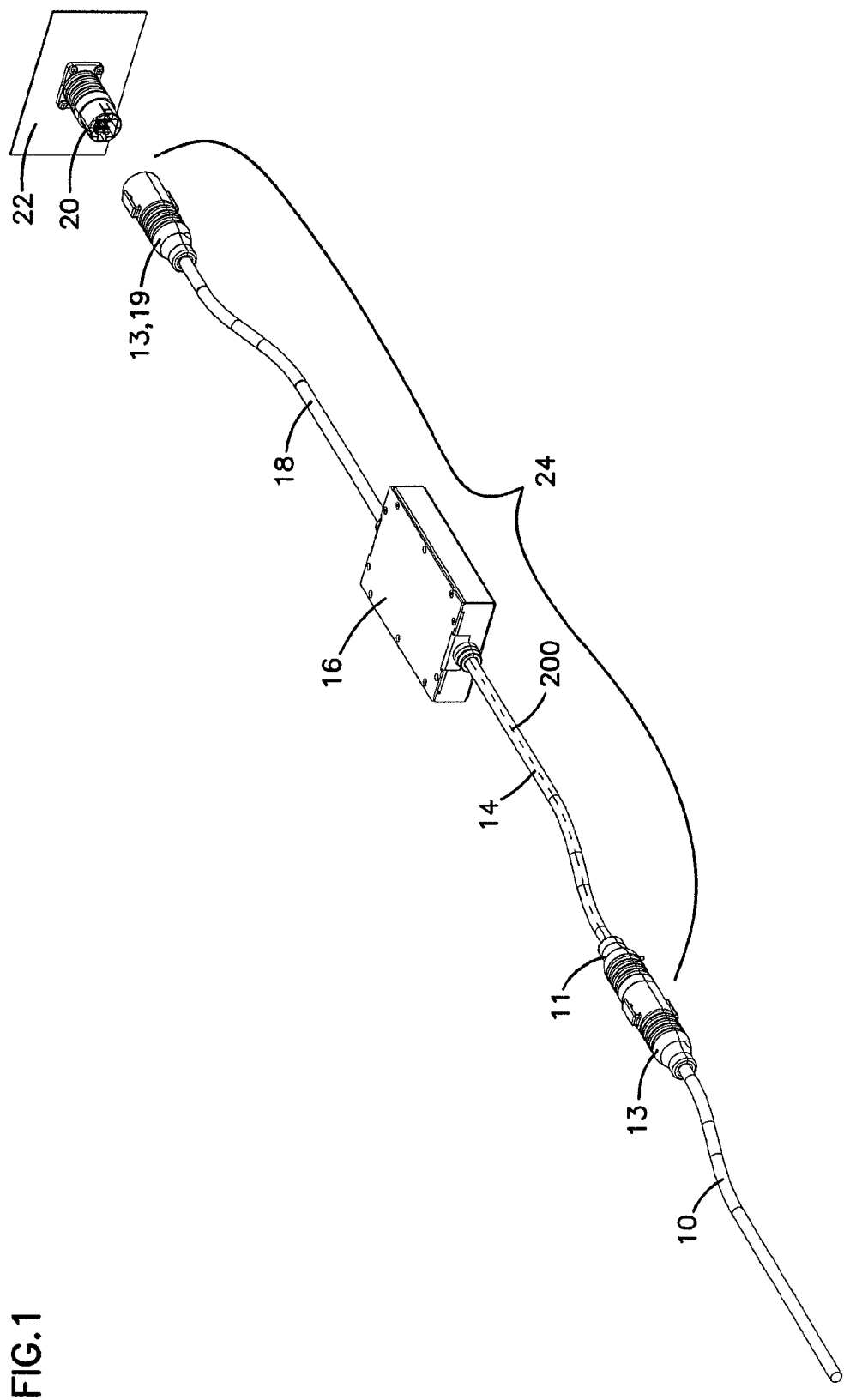
FIG. 1 is a perspective view of a hybrid fiber/copper cable assembly for connecting to a camera and including a junction box between a pair of cable connectors, with a optical fiber repair shown in dashed lines along one of the cable segments.

FIG. 1 illustrates a several segments of hybrid fiber and copper broadcast communications cable such as might be used to connect a camera to a production facility, such as at a sporting event or other entertainment venue. The segments of cable shown in FIG. 1 include a first segment 10 extending from the production facility and terminated with a first cable connector 13. Connector 13 is mated with a second cable connector 11 which terminates a second cable segment 14. Cable segment 14 extends from one end of a junction box 16 and a third cable segment 18 extends from the other end. Cable segment 18 is terminated with a third cable connector 19 (similar to first connector 13), which is configured to mate with a bulkhead mounted connector 20 positioned on a bulkhead 22, which may form a portion of a camera. Second and third cable segments 14 and 18, with second and third connectors 11 and 19, along with junction box 16, may make up a camera connection assembly 24 that a camera operator would carry, such as on a belt mount, when operating a shoulder carried or other portable or mobile camera configuration.

Known assemblies for connecting a camera to a broadcast cable might require the use of a new assembly in case of failure of any single component within the assembly. Alternatively, the failure of any of the contacts within either connector might necessitate the retermination of one of the cable segments. As will be described further below, connectors 11 and 19, in conjunction with junction box 16, permit easier repair or replacement of damaged components of assembly 24. Shown in dashed lines along segment 14 between junction box 16 and connector 11 is a replacement fiber 200, which will be described in further detail below.

Figure 2:
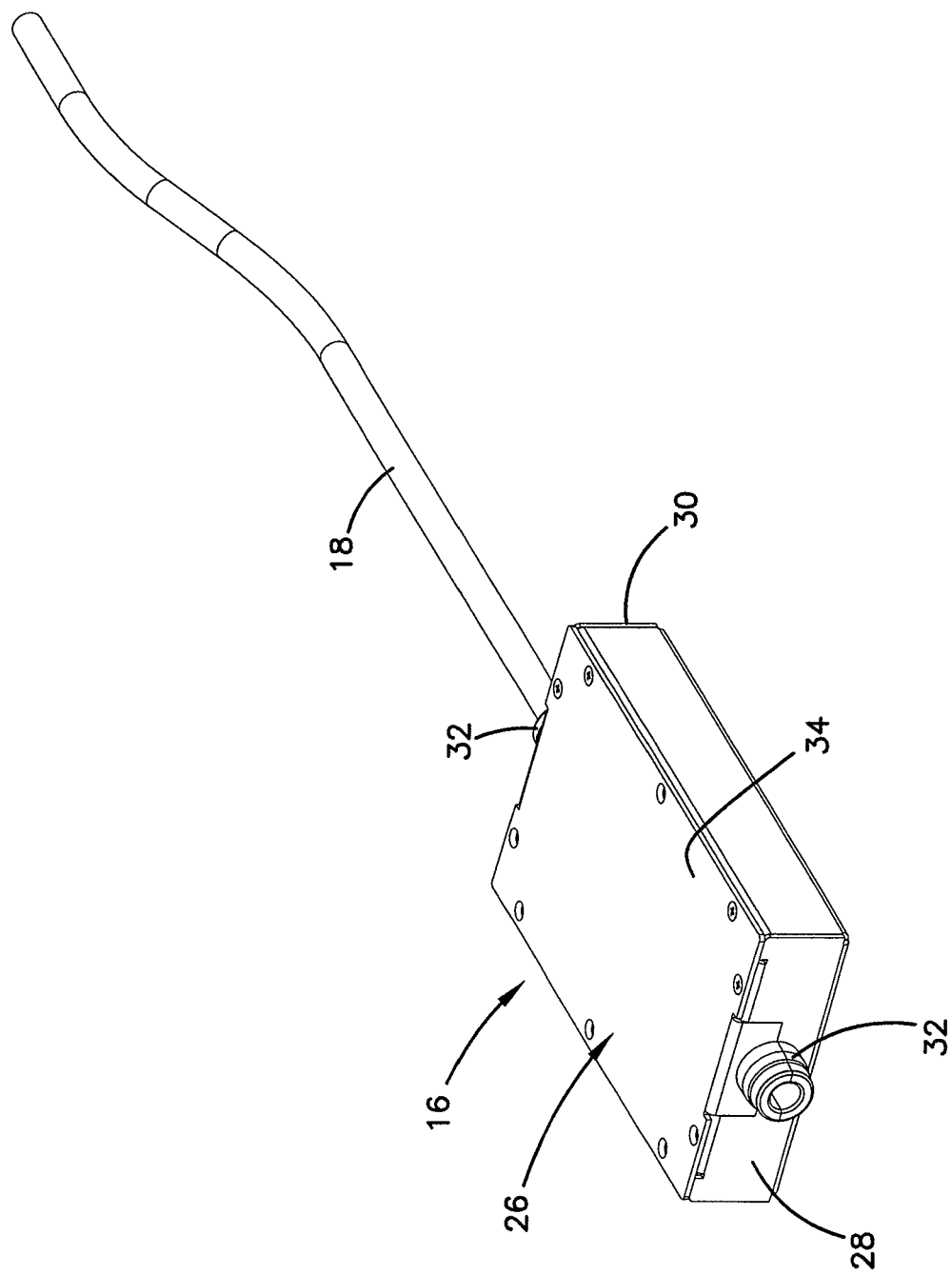
FIG. 2 is a perspective view of the junction box of FIG. 1, with a first hybrid cable extending from one side of the junction box.

Referring now to FIG. 2, junction box 16 includes a first end 28 and a second end 30. In each end is a cable entry fitting 32 to permit cable segments 14 and 18 to enter junction box 16. Fittings 32 provide a seal about cable segments 14 and 18 to prevent entry of environmental contaminants into junction box 16. Junction box 16 also includes a housing 26 with a removable cover 34 permitting access to an interior of junction box 16 for repair or replacement of components within junction box 16.

Figure 3:
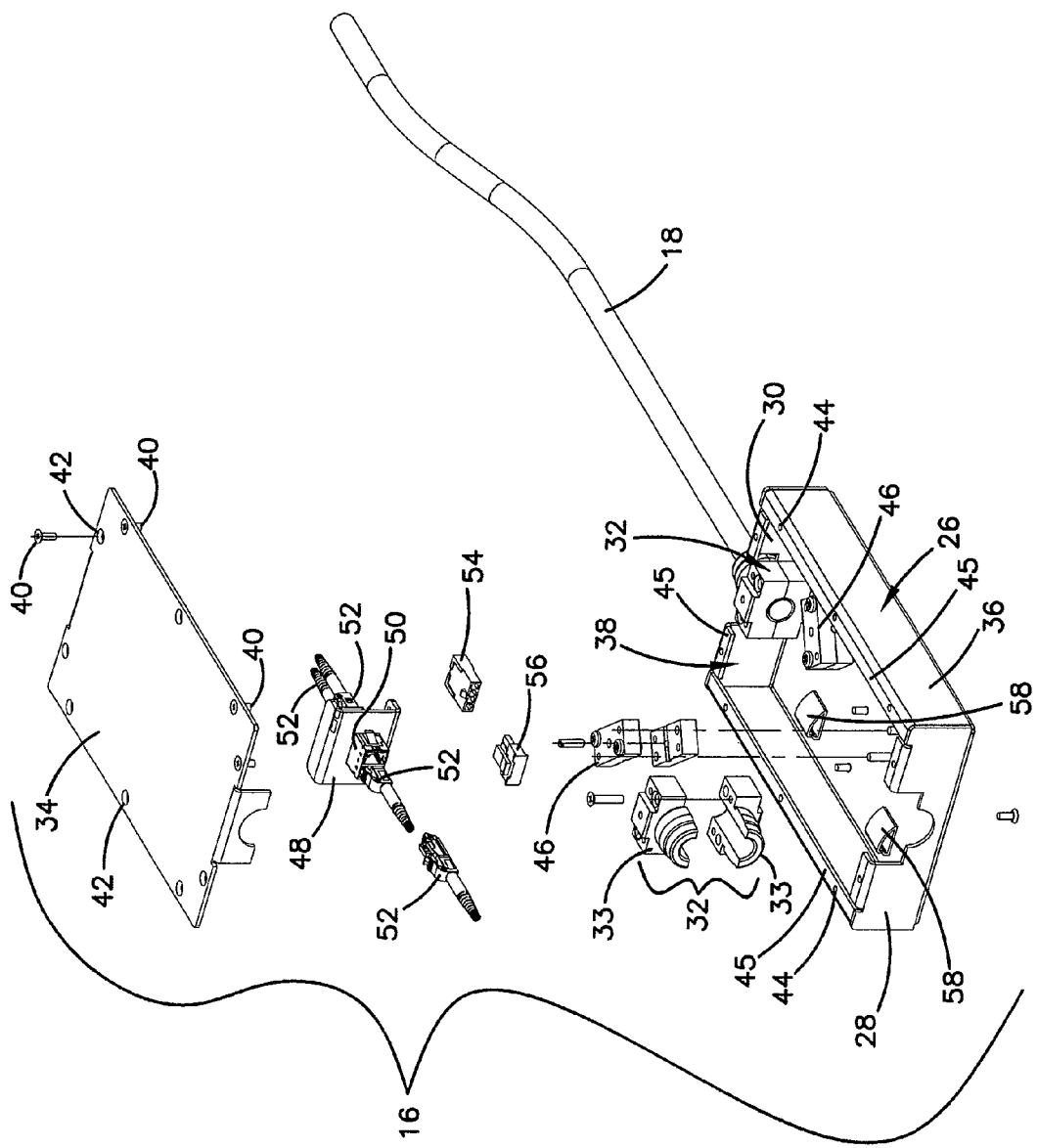
FIG. 3 is an exploded perspective view of the junction box of FIG. 2, with fiber connectors shown for a second hybrid cable.

Referring now to FIG. 3, housing 26 of junction box 16 includes a main housing 36 which cooperates with cover 34 to define an interior 38 within which different components to connect fiber strands and copper conductors of cable segments 14 and 18. Fittings 32 may include a pair of identical halves 33 which fit closely about cable segments 14 and 18. Other alternative configurations of fittings 32 are anticipated provided they permit extension of additional cables external to segments 14 or 18 from interior 38. Cover 34 may be removably held to main housing 36 by a plurality of removable fasteners such as screws 40 extending through openings 42 in cover 34 and engaging mating openings 44 in flanges 45 of main housing 36.

Within interior 36 may be a pair of anchors 46 for receiving and securing a linear strength member which extend within either of cable segments 14 and 18. Also mounted within interior 38 is a bulkhead 48 with a fiber optic adapter 50 mounted to it. Fiber optic adapter 50 is configured to receive two fiber optic connectors 52 in each end. Known adapter 50 is a standard fiber optic adapter to align and optically connect pairs of connectors 52, and known connectors 52 may be mounted to the end of and terminate optical fibers extending within each of cable segments 14 and 18. Other styles and types of fiber optic connectors and mating adapters may be used within junction box 16. Also within interior 38 may be a pair of mating pin connectors 54 and 56, which may terminate copper conductors extending within each of cable segments 14 and 18, and also to electrically connect these copper conductors. Other types and styles of connectors for connecting copper conductors may also be used within junction box 16. Interior 38 may also include one or more cable routing features 58 to aid the positioning of optical fibers and copper conductors within junction box 16.

Figure 4:
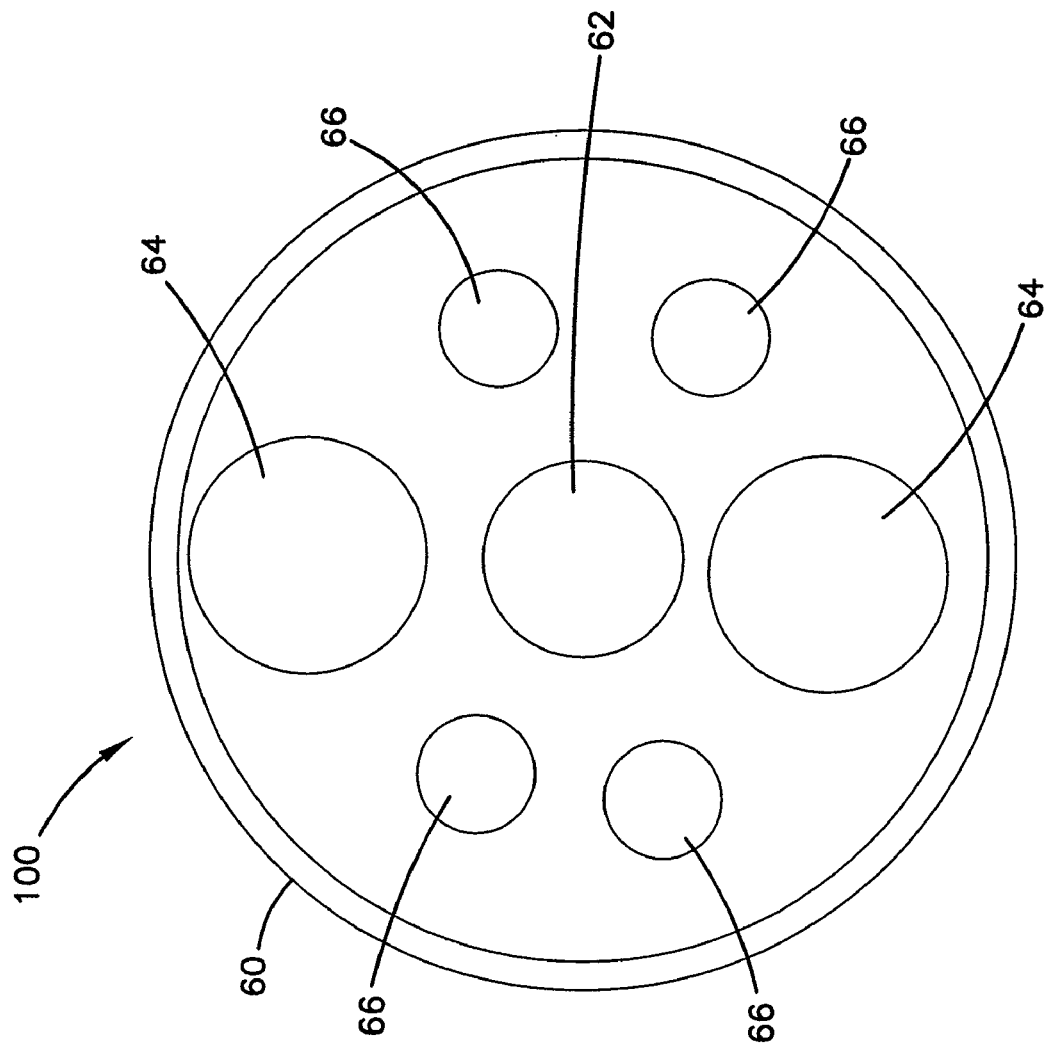
FIG. 4 is a schematic cross-section of a prior art hybrid fiber/copper cable including two optical fibers and four copper wires.

FIG. 4 illustrates a schematic cross-section of a hybrid fiber/copper communications cable 100, such as might be used for cable segments 10, 14 and 18. Cable 100 includes an outer sheath 60 and may include a linearly extending central strength member 62. Cable 100 as shown includes a pair of jacketed optical fibers 64 and four jacketed copper conductors 66, positioned within outer sheath 60 and extending adjacent strength member 62. Other configurations of hybrid cables are known, with more or fewer optical fibers and/or copper conductors. When used in the broadcast camera environment described above, one of the optical fibers 64 may be used to transmit video and related audio signals to the camera and the second optical fiber 64 may be used to transmit video and audio captured by the camera to the production facility or some other location. One pair of copper conductors 66 may be used to provide power to operate the camera, while the other pair of copper conductors 66 may be used to provide communications between the production facility and the camera operator. The number of fiber strands and copper conductors extending within cable 100 may be varied as required to support the desired usage and communication bandwidth of the camera.

Figure 5:
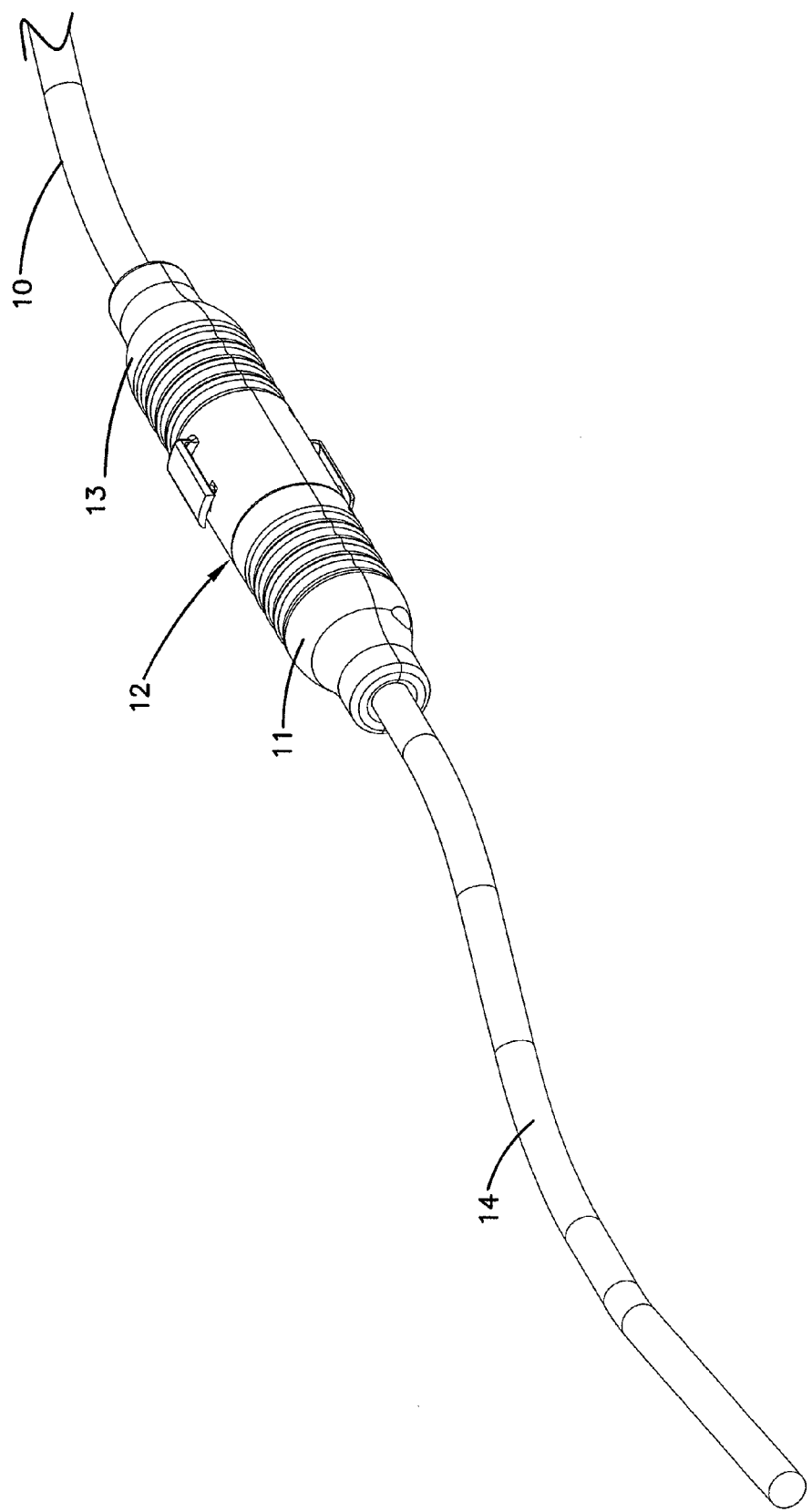
FIG. 5 is a perspective view of a pair of mating hybrid cable connectors of FIG. 1.
Figure 6:
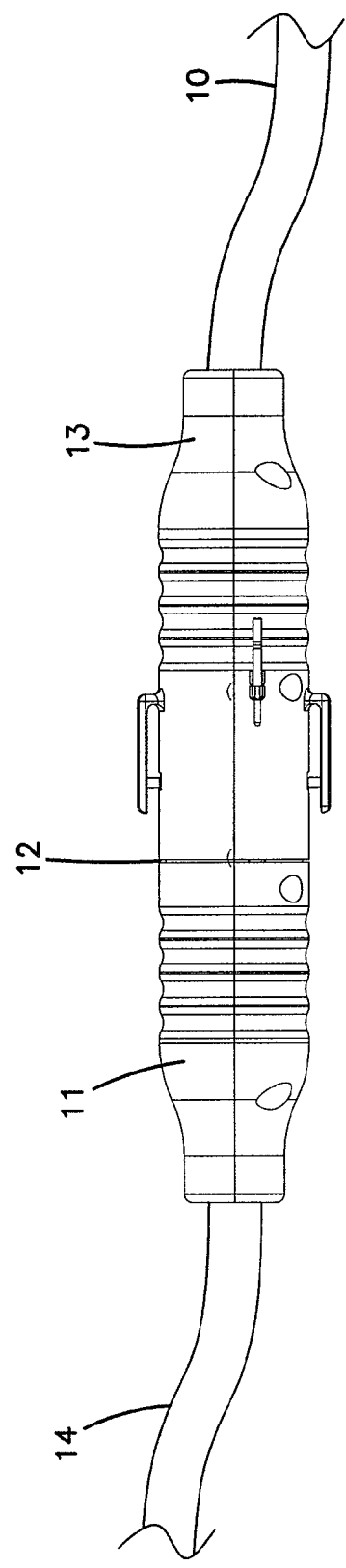
FIG. 6 is a side view of the pair of mating hybrid cable connectors of FIG. 5.

FIGS. 5 and 6 show first cable segment 10 terminated by connector 11, with connector 11 mated with connector 13 which terminates second cable segment 14, as shown in FIG. 1. Connectors 11 and 13 cooperate to optically connect the fiber strands 64 of cable segment 10 with those of cable segment 14, and to electrically connect copper conductors 66 of cable segment 10 with copper conductors 66 of cable segment 14. These two connectors cooperate to form a secure and generally weather-tight cover 12 about the connections of the fiber strands and copper conductors. As shown, connector 11 is defined as a male or plug connector and connector 13 is a female or socket connector.

Figure 7:
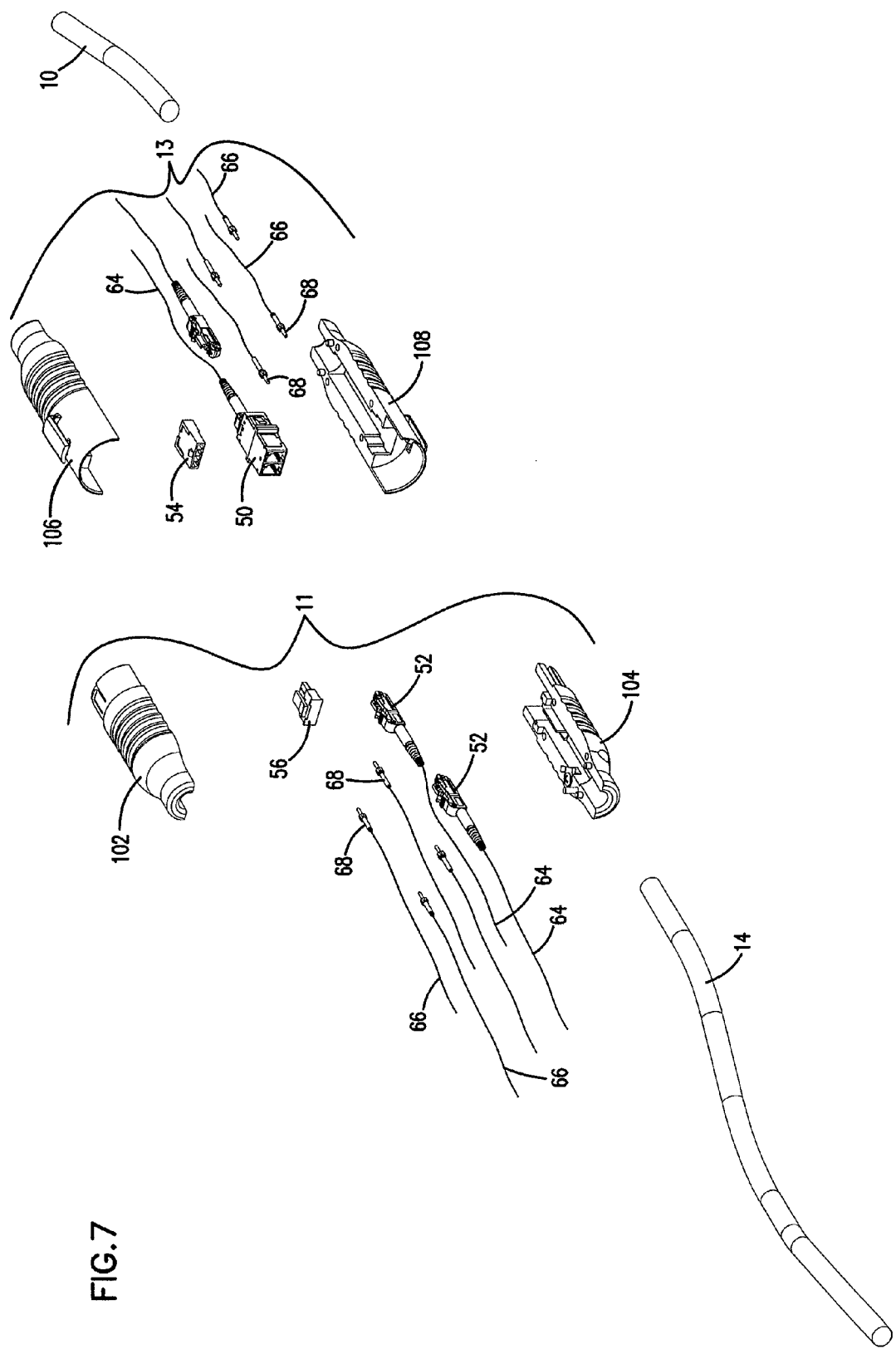
FIG. 7 is an exploded perspective view of the mating pair of connectors as shown in FIG. 5.
Figure 8:
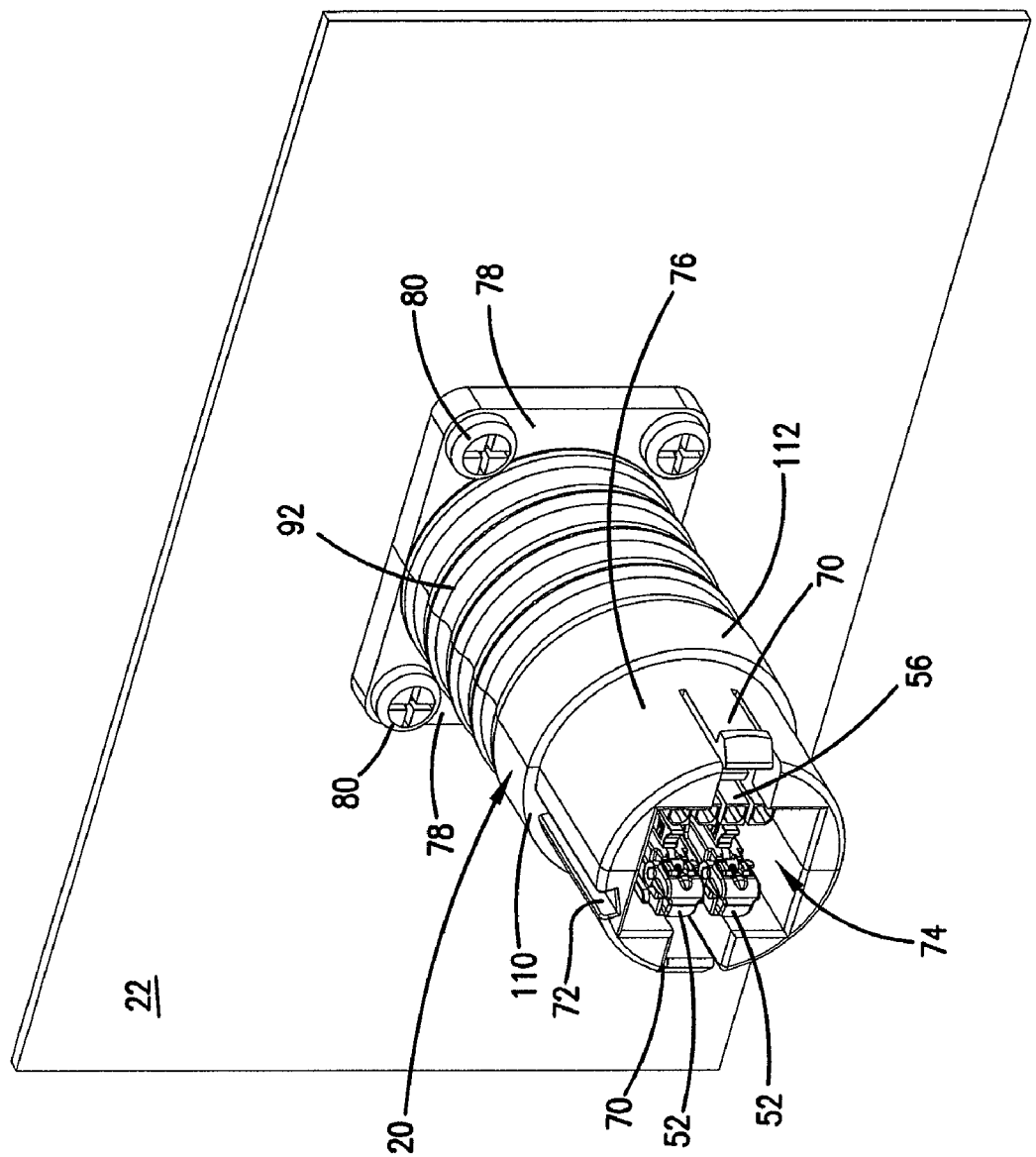
FIG. 8 is a perspective view of a camera bulkhead mount cable connector of FIG. 1.
Figure 9:
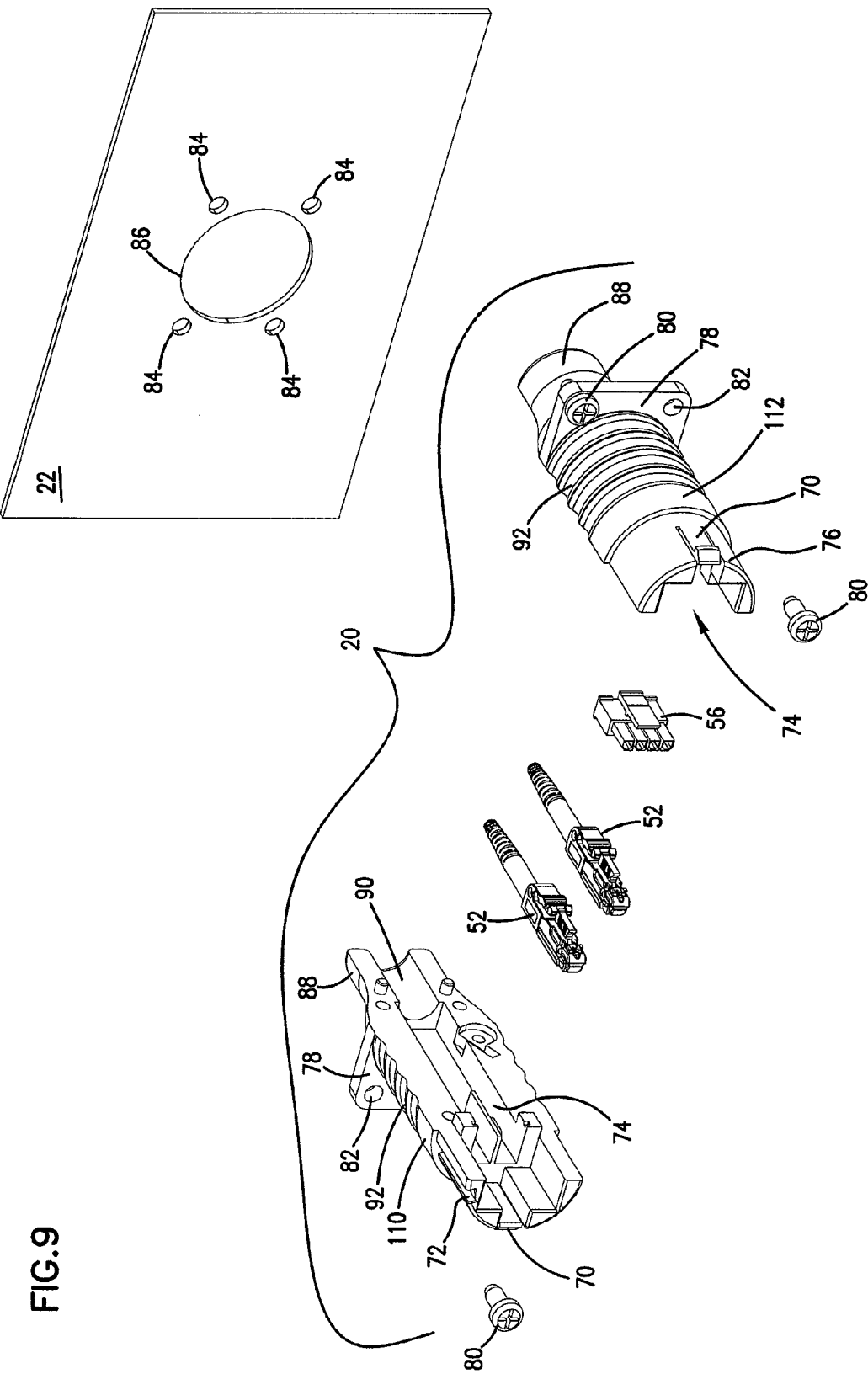
FIG. 9 is an exploded perspective view of the bulkhead mount cable connector of FIG. 8.
Figure 11:
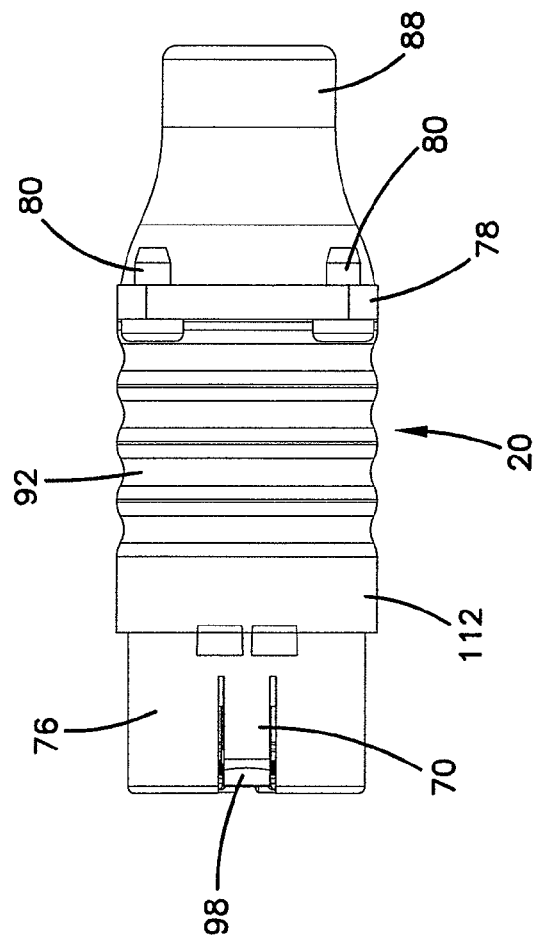
FIG. 11 is a side view of a first mating cable connectors of FIG. 5.
Figure 10:
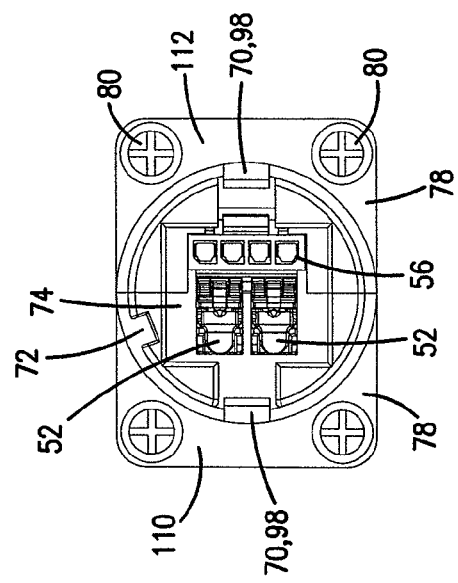
FIG. 10 is an end view of the bulkhead mount cable connector of FIG. 8.

FIG. 7 shows both connectors 11 and 13 including a pair of fiber optic connectors 52 which terminate fiber strands 64 within each cable segment 10 and 14. These connectors are brought together, aligned and optically connected by adapter 50 mounted within connector 13. Each copper conductor 66 may be terminated by a pin contact 68 and these pin contacts 68 may be mounted within mating pin connectors 54 and 56, with pin connector 54 mounted within connector 11 and pin connector 56 mounted within connector 13. Connector 11 includes an outer housing defined by two housing portions 102 and 104. Connector 13 includes an outer housing defined by two housing portions 106 and 108.

Referring now to FIGS. 8 to 11, bulkhead mounted connector 20 includes an outer housing defined by two housing portions 110 and 112. Housing portions 110 and 112 define a central cavity 74 within which two connectors 52 and one pin connector 56 are mounted. Housing portions 110 and 112 also define an outer barrel portion 76 which is sized for insertion within a connector 13. Barrel portion 76 includes a pair of opposing tabs 70 to permit connector 13 to releasable captured about barrel portion 76, and an alignment feature 72 which engages a mating feature of connector 13 to properly orient connector 13 for mating with connector 20. Each housing portion 110 and 112 includes a mounting flange 78. Openings 82 are defined through flanges 78 for receiving removable fasteners such as screws 80 which engage fastener openings 84 of bulkhead 22. Openings 84 are positioned about an opening 86 in bulkhead 22 which is sized to receive a rear portion 88 of connector 20, opposite barrel portion 76.

Each housing portion 110 and 112 includes a cable receiving end 90 of cavity 74, adjacent rear portion 88. Cables from within the camera or any other equipment, of which bulkhead 22 may form part of the case, enclosure or cabinet, enter into cavity 74 through cable receiving end 90. Additional features of the structure of housing portions 110 and 112 within cavity 74 connector 20 are similar to features of housing portions 102 and 104 of connector 11, shown in FIGS. 16 to 19, below.

Referring now to FIGS. 12 and 13, connector 11 includes the same exterior features as connector 20, with the exception of the flanges 78. Connector 11 is intended for mounting to the end of a freestanding cable, so mounting flanges for mounting to a bulkhead 22 are not necessary. Connector 11 does include an intermediate grip portion 92 to facilitate grasping connector 11 to break a seal 12 between connectors 11 and 13.

FIGS. 14 and 15 show connector 13 including a barrel receiving end 77 within which barrel portion 76 of connector 11 or connector 20 may be received. Barrel receiving end 77 defines an entry into a cavity 75 defined by the housing portions 106 and 108. Adapter 50 and pin connector 54 are mounted within cavity 75. A pair of openings 96 through barrel receiving end 77 are positioned to engage catches 98 of tabs 70 of connector 11 or 20 to releasably hold barrel portion 76 within connector 13. A pair of tab release arms 71 is positioned above openings 96 and each includes a tab release 94. Tab release arms 71 are inwardly deflectable, and when deflected inward, tab releases 94 extend through openings 96 to inwardly deflect tabs 70 from openings 96 so that barrel portion 76 may be removed from barrel receiving portion 77. Inside barrel receiving portion 77 and cavity 75 is an alignment feature 73 which cooperates with alignment feature 72 of barrel portion 76 to align connectors for mating.

When properly aligned by alignment features 72 and 73, connector 13 will mate with either connector 11 or 20 with the fiber connectors 52 aligned to extend into adapter 50 to optically connect fiber strands 64 and pin connectors 54 and 56 aligned to mate and electrically connect copper conductors 66. As shown in FIG. 7, within cavity 75 of connector 13, a pair of fiber connectors 52 terminating fiber strands 64 of cable 14 segment are already positioned in an inner end of adapter 50. When inserted into adapter 50 by mating of connectors 11 and 13, fiber connectors 52 of connector 11 will be optically connected with fiber connectors 52 of connector 13.

Figure 16:
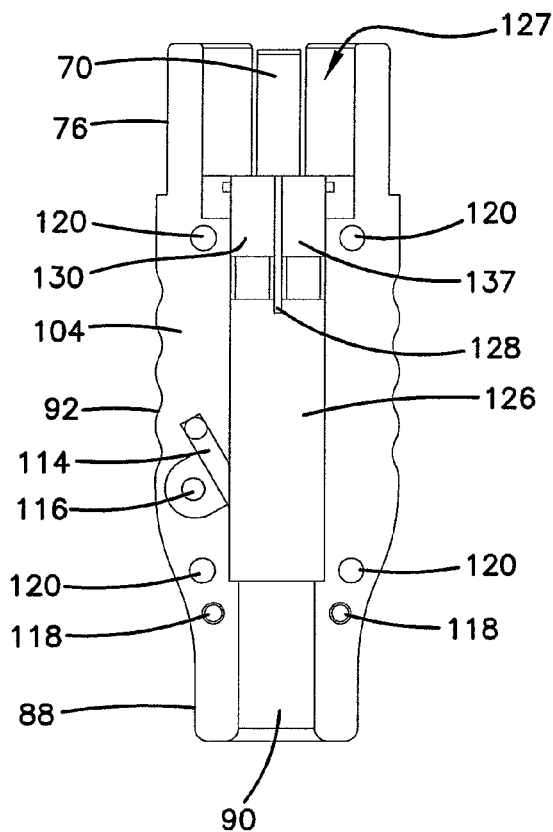
FIG. 16 is an inner side view of a first housing half of the cable connector of FIG. 11.
Figure 18:
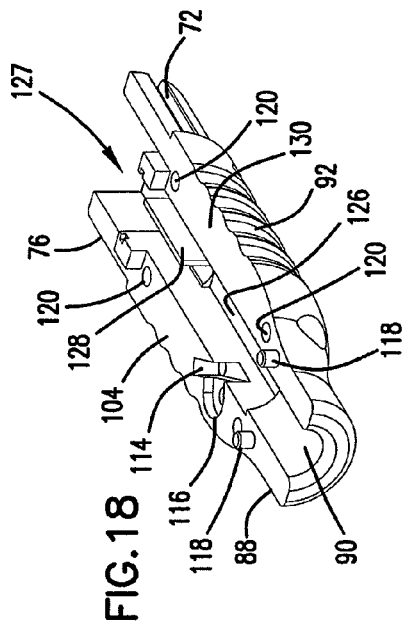
FIG. 18 is a second perspective view of the first housing half of FIG. 16.
Figure 17:
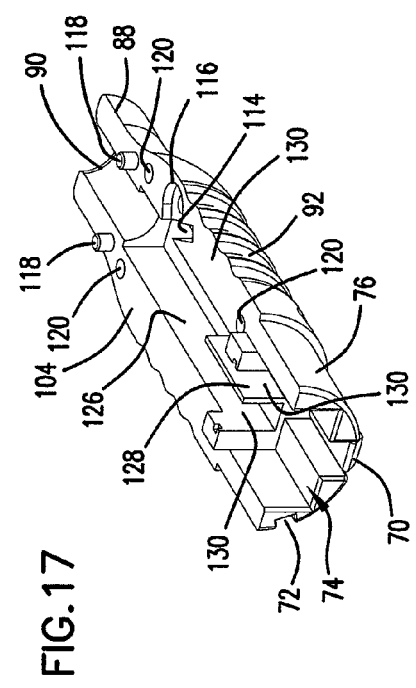
FIG. 17 is a first perspective view of the first housing half of FIG. 16.

Referring now to FIGS. 16 to 18, housing portion 104 of connector 11 includes a recess 126 which defines a portion of cavity 74 with a connector opening 127 and cable opening 90 on opposite ends. On one side of recess 126 is a strength member recess 114 and fastener opening 116 for receiving a fastener to clamp strength member 62 of cable 100. A pair of alignment pins extend from an inner face 130 to aid in positioning of housing portions 102 and 104 for joining to form connector 11. A plurality of fastener openings 120 are formed in face for receiving fasteners to join housing portions 102 and 104. Recess 126 includes a longitudinal bulkhead 128 adjacent connector opening 127 which defines a pair of adjacent slots for receiving fiber connectors 52. Alternatively, housing portion 104 could be configured to include a cable clamp mounting arrangement, similar to housing portion 104, described below.

Figure 19:
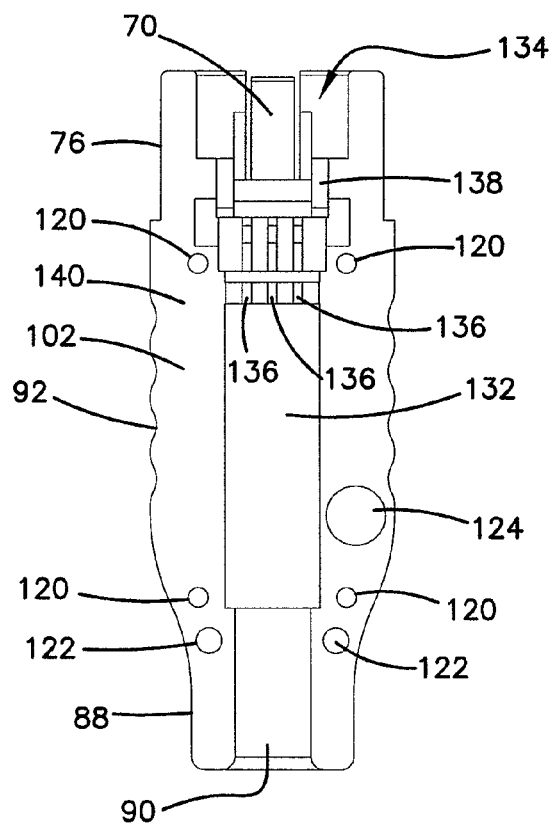
FIG. 19 is an inner side view of a second housing half of the cable connector of FIG. 11.
Figure 21:
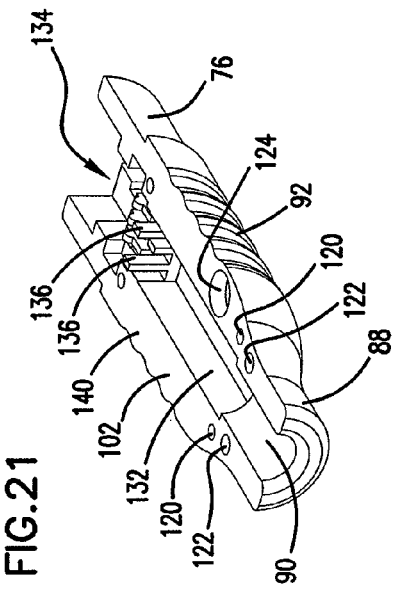
FIG. 21 is a second perspective view of the second housing half of FIG. 16.
Figure 20:
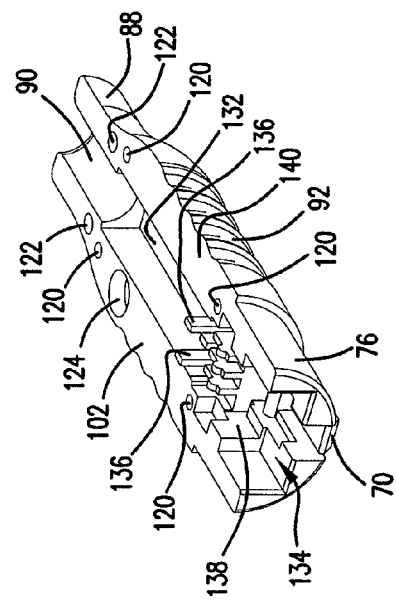
FIG. 20 is a first perspective view of the second housing half of FIG. 16.

FIGS. 19 to 21 show housing portion 102 including pin openings 122 positioned to cooperate with alignment pins 118 to align housing portions 102 and 104. Openings 120 are positioned to receive fasteners extending through openings 120 of housing portion 104. A recess 124 is positioned on an inner face 140 to permit a cable clamp to be positioned in recess 114 and opening 116. Strength member 62 of cable 100 can be trimmed to fit within recess 114 and a cable clamp including a fastener such as a screw mounted within opening 116 to secure connector 11 to cable 100. Alternatively, housing portion 102 could not include recess 114 and opening 116 if such an anchor is not required. A recess 132 extends between cable entry 90 and a connector opening 134 on opposite ends. A plurality of fingers 136 extend within recess 132 to organize copper conductors 66 extending from cable 100 to pin connector 56. A pin connector mounting area 138 is defined on the connector opening side of pins 136.

When mounted together as shown in FIGS. 12 and 13, recesses 126 and 136 cooperate to form cavity 74 within connector 11.

Figure 22:
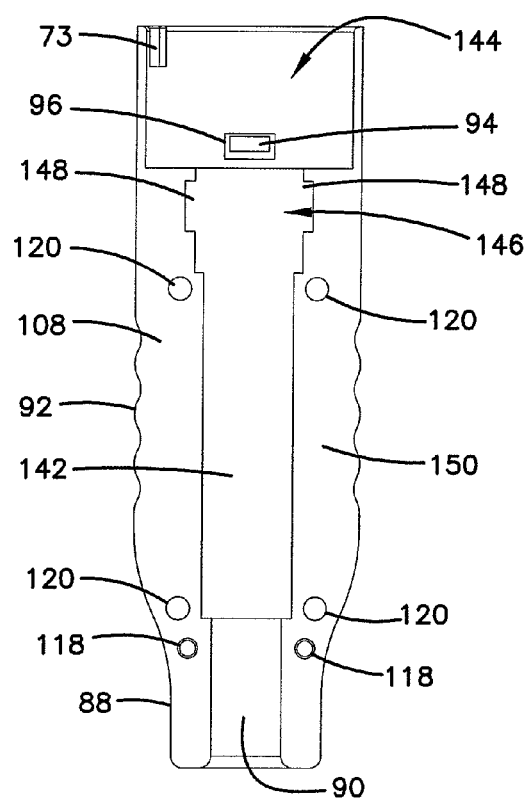
FIG. 22 is an inner side view of a first housing half of the cable connector of FIG. 14.

FIGS. 22 to 24 show housing portion 108 of connector 13 including a recess 142 extending from a connector receiving opening 144 to cable entry 90 on opposite ends. Within recess 142 is an adapter receiving area 146 adjacent connector receiving opening 144. Adapter receiving area 146 is sized to closely fit about adapter 50 and includes a flange recess 148 on either side to engage a flange of adapter 50 to secure adapter 50 in the desired position within recess 142. Housing portion 108 also includes a pair of alignment pins 118 and a plurality of fastener openings 120 in an inner face 150. Alternatively, housing portion 108 could be configured to include a cable clamp mounting arrangement, similar to recess 114 and opening 116 of housing portion 104, above.

Figure 25:
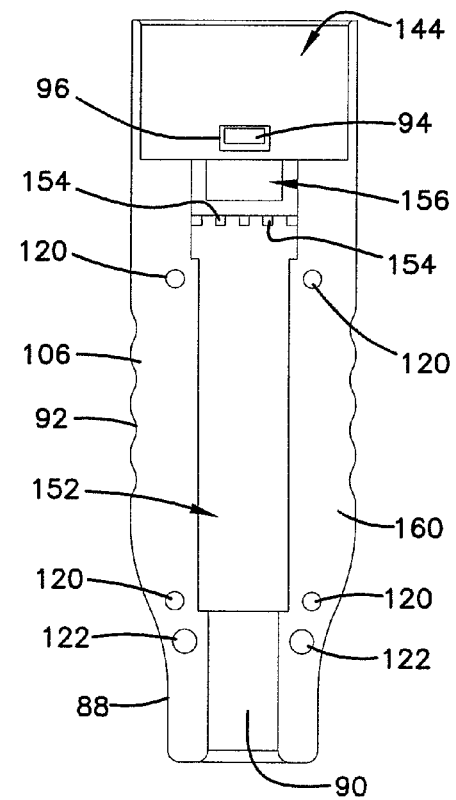
FIG. 25 is an inner side view of a second housing half of the cable connector of FIG. 14.

FIGS. 25 to 27 show housing portion 106 of connector 13 including a recess 152 extending from connector receiving end 144 to cable entry 90. Within recess 152 are a plurality of fingers 154 and a pin connector mounting area is defined between fingers 154 and connector receiving end 144. Fingers 154 organize and direct copper conductors 66 of cable 100 and serve to correctly position pin connector 54 within connector 13 so that pin connector 54 engages pin connector 56 of mating connector 11. An inner face 160 of housing portion 106 includes a plurality of fastener openings 120 for receiving fasteners extending through openings 120 of housing portion 108 to hold the two housing portions together to form an outer housing of connector 13. Alternatively, housing portion 106 could be configured to include a cable clamp mounting arrangement, similar to recess 114 and opening 116 of housing portion 104, above.

When mounted together as shown in FIGS. 14 and 15, recesses 142 and 152 cooperate to form cavity 75 within connector 13.

It is preferable that both connectors 11 and 13 be constructed with outer housings having two or more portions which are removable to expose the interior cavity of the connectors. It is also preferable that cable entry 90 of connectors 11 and 13, as well as cable fittings 32 of junction box 16 be sized slightly larger than the diameter of outer sheath 60 of cable 100. It is known for one or more elements 64 and 66 within cable 100 in segments 14 or 18 or the connectors terminating these elements (such as fiber connectors 52 and pin connectors 54 and 56) to be damaged, necessitating repair or replacement of assembly 24. While replacement is possible and is the common response to damage, this solution requires a camera operator to carry an entire spare assembly 24. Alternatively, to repair a damaged termination 52, 54 or 56, either connector 11 or 13 of cable segment 14 or 18 extending from junction box 16 could be removed and that cable segment could be reterminated. However, retermination is time consuming and can difficult to accomplish in the field, where the damage is likely to occur while using the camera. Assembly 24 is constructed to permit individual elements 64 or 66 of cable 100 or terminations 52, 54 or 56 of these elements to be quickly replaced in the field by a camera operator with simple tools and does not require that the camera operator carry an extensive array of replacement items.

Figure 28:
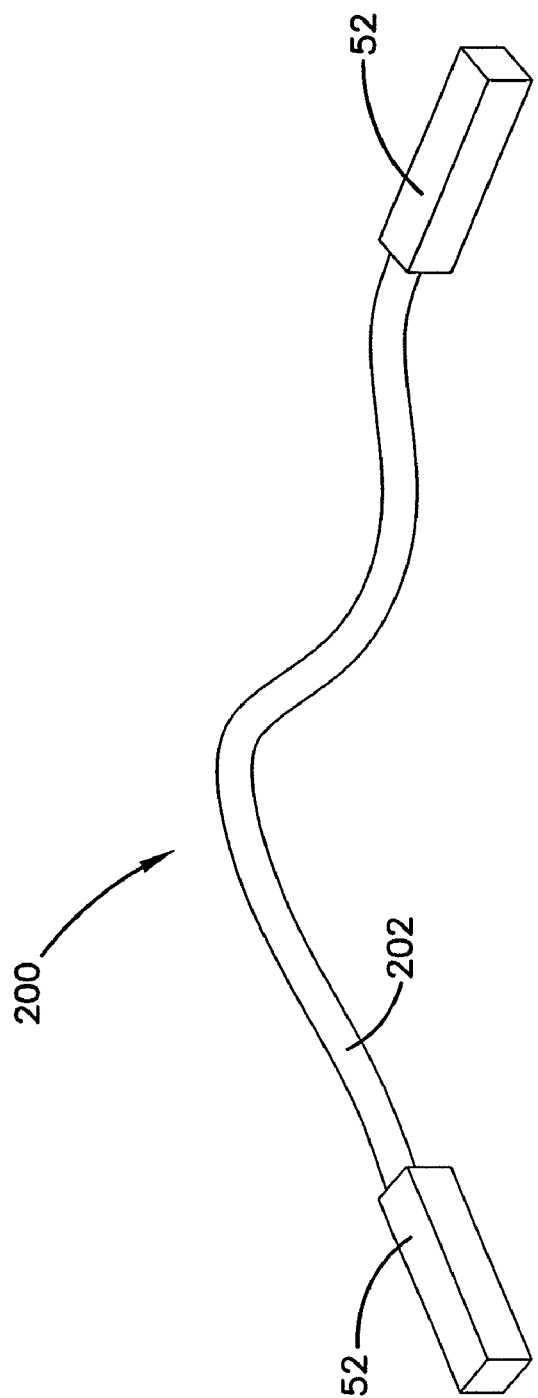
FIG. 28 is a replacement fiber segment for use with the junction box and cable segments of FIG. 1.

If one of the fiber strands 64 within cable 100 in cable segment 18 were damaged, and the camera operator can identify the damaged strand, the camera operator may open junction box 16 by removing cover 34 from main housing 28. With interior 38 exposed, the fiber connector 50 terminating the damaged fiber may be removed from adapter 50 within junction box 16 and moved to one side. Replacement fiber segment 200, as shown in FIG. 28, may include ends terminated with connectors 52. One of these connectors 52 may be inserted within adapter 50 in place of connector 52 of damaged fiber 64. The top half 33 of cable fitting 32 is removed from about cable 100 and a cable length 202 between connectors 52 of replacement fiber 200 extended out of junction box 16 along cable segment 18. As shown, cable length 202 of replacement fiber segment 200 includes a jacketed fiber optic cable such as a standard 2 to 3 millimeter fiber cable. As this cable length 202 is intended primarily as a temporary field repair, and will be extended along and supported by one of the cable segments 14 or 18, additional reinforcing structure other than typical jacketing should not be required. Of course, more heavily protected cable jackets and other reinforcing structures within cable length 202 may be used as convenient or desirable, based on the conditions to which assembly 24 may be subject to or based on the repair materials that may readily available to the camera operator.

Replacement fiber segment 200 is extended along cable segment 18 to connector 13. Connector 13 is removed from bulkhead connector 20 and fasteners holding housing portions 106 and 108 together are removed. Housing portions 106 and 108 are separated from each other permitting access into recess 142 of housing portion 108. Within recess 142, fiber connector 52 terminating the damaged fiber strand 64 is removed from adapter 50. This fiber connector 52 is removed from recess 142 to provide room for connector 52 terminating an end of replacement fiber 200. This connector 52 of replacement fiber 200 is inserted within adapter 50 in place the removed damaged connector 52 of cable segment 18. Cable length 202 is extended from adapter 50 within recess 142 out of cable entry 90 and housing portions 106 and 108 are refastened together.

The damaged fiber strand 64 of cable 100 of cable segment 18 has been replaced with replacement fiber 200 and the camera operator can continue operating the camera.

A similar process is followed to replace a damaged copper conductor or damaged pin connector. In either replacement scenario, the replacement fiber or copper is extended out of junction box 16 and cavity 74 along cable segment 18. This replacement fiber is copper may be attached to cable segment 18 to provide support or additional protection to the replacement.

The above specification, examples and data provide a complete description of the manufacture and use of the invention. Since many embodiments of the invention can be made without departing from the spirit and scope of the invention, the invention resides in the claims hereinafter appended.

What is claimed is:

1. A hybrid communications cable connector system comprising:
    a first housing defining an interior cavity with an open first end and an open second end;
        the second end of the interior cavity of the first housing sized to receive a first communications cable including at least one optical fiber and at least one electrical conductor, the at least one optical fiber terminated by a first optical fiber connector, the first optical fiber connector and the electrical conductor of the first communications cable located within the interior cavity of the first housing;
    a second housing defining an interior cavity with an open first end and an open second end;
        the second end of the interior cavity of the second housing sized to receive a second communications cable including at least one optical fiber and at least one electrical conductor, the at least one optical fiber terminated by a second optical fiber connector, the second optical fiber connector and the electrical conductor of the second communications cable located within the interior cavity of the second housing;
        the interior cavity of the second housing also including a fiber optic adapter into which is inserted the second optical fiber connector terminating the at least one optical fiber of the second communications cable, the fiber optic adapter being a stand-alone adapter that is removably mounted within the interior cavity of the second housing such that the fiber optic adapter can support and optically mate the first and second optical fiber connectors outside of the interior cavity of the second housing; and
    the first ends of the first and second housings adapted to engage each other with the first optical fiber connector terminating the at least one optical fiber of the first communications cable received within the removable, stand-alone fiber optic adapter and with the at least one electrical conductors of the first and second communications cables mated.

2. The hybrid communications cable connector system of claim 1, wherein the first housing includes a clamp for receiving and holding a strength member of the first communications cable.

* * * * *